US006733805B1

(12) United States Patent
Loisel et al.

(10) Patent No.: US 6,733,805 B1
(45) Date of Patent: May 11, 2004

(54) FOOD PRODUCT COMPRISING A SOLID MASS BASED ON CHOCOLATE OR THE LIKE IN CONTACT WITH AN AQUEOUS PHASE

(75) Inventors: Christophe Loisel, Soisy-sur-Seine (FR); Jean Luc Rabault, Breuillet (FR); Francoise Warin, Bagneux (FR)

(73) Assignee: Lu France en Abrege LF SA, Ris Orangis (FR)

( * ) Notice: Subject to any disclaimer, the term of this patent is extended or adjusted under 35 U.S.C. 154(b) by 0 days.

(21) Appl. No.: 09/979,171

(22) PCT Filed: May 19, 2000

(86) PCT No.: PCT/FR00/01368

§ 371 (c)(1),
(2), (4) Date: Mar. 1, 2002

(87) PCT Pub. No.: WO00/70959

PCT Pub. Date: Nov. 30, 2000

(30) Foreign Application Priority Data

May 21, 1999 (FR) .............................................. 99 06480

(51) Int. Cl.$^7$ ................................................ A23G 1/00
(52) U.S. Cl. ............................ 426/93; 426/89; 426/98; 426/99; 426/631; 426/660
(58) Field of Search ............................ 426/631, 89, 99, 426/98, 93, 660

(56) References Cited

U.S. PATENT DOCUMENTS

| 3,769,030 | A | * | 10/1973 | Kleinert | 426/45 |
|---|---|---|---|---|---|
| 3,966,997 | A | * | 6/1976 | Warkentin | 426/631 |
| 4,011,349 | A | * | 3/1977 | Riesen | 426/548 |
| 4,078,093 | A | * | 3/1978 | Girsh | 426/593 |
| 4,888,187 | A | | 12/1989 | Given, Jr. et al. | |
| 5,626,900 | A | * | 5/1997 | Miller | 426/580 |
| 5,820,913 | A | | 10/1998 | Grassler et al. | |
| 5,882,709 | A | * | 3/1999 | Zumbe | 426/481 |
| 5,932,277 | A | * | 8/1999 | Dubberke | 426/631 |
| 5,962,063 | A | * | 10/1999 | Siukola et al. | 426/631 |
| 5,965,179 | A | * | 10/1999 | Ducret et al. | 426/72 |
| 5,989,619 | A | * | 11/1999 | Zumbe et al. | 426/631 |
| 6,143,350 | A | * | 11/2000 | Dubberke | 426/631 |
| 6,165,540 | A | * | 12/2000 | Traitler et al. | 426/631 |
| 6,203,831 | B1 | | 3/2001 | Eder et al. | |
| 6,231,902 | B1 | | 5/2001 | Grassler et al. | |
| 6,261,627 | B1 | * | 7/2001 | Armstrong et al. | 426/584 |
| 6,296,891 | B1 | * | 10/2001 | Zumbe et al. | 426/631 |
| 6,305,275 | B2 | | 10/2001 | Grassler et al. | |
| 6,309,689 | B1 | * | 10/2001 | Weaber et al. | 426/588 |
| 6,391,373 | B1 | * | 5/2002 | Kaiser et al. | 426/631 |
| 6,582,747 | B2 | * | 6/2003 | Myers et al. | 426/593 |

FOREIGN PATENT DOCUMENTS

| EP | 0 615 692 | 3/1993 |
|---|---|---|
| EP | 0 664 959 | 1/1994 |
| EP | 0 686 354 | 12/1995 |
| EP | 0 770 332 | 5/1997 |
| EP | 0 839 456 | 5/1997 |
| FR | 2 759 255 | 8/1998 |
| WO | WO 97/15198 | 5/1997 |

OTHER PUBLICATIONS

Derwent Abstract of EP 0 839 456.
Derwent Abstract of EP 0 770 332.
Derwent Abstract of EP 615 692.
Derwent Abstract of EP 686 654.
Derwent Abstract of FR 2 759 255.
US 2001/0018083, published on Aug. 30, 2001.
US 2001/0007692, published on Jul. 12, 2001.

\* cited by examiner

*Primary Examiner*—Carolyn Paden
(74) *Attorney, Agent, or Firm*—Finnegan, Henderson, Farabow, Garrett & Dunner, LLP

(57) ABSTRACT

A food product comprising a substantially solid mass based on chocolate or a chocolate-like product in contact with an aqueous phase in unfrozen state, with a local free moisture content ranging between 30% and 45%, preferably between 35% and 45%, said substantially solid mass having a low water intake in suitable conditions of preservation. The substantially solid mass comprises in weight percentage: 43 to 68% of fat; <25% of defatted dry cocoa; <17% of skim milk powder; appropriate amounts of sugar >13%, the solid mass being such that for an aqueous phase having a local free moisture content ranging between 30% and 45%, preferably 35 and 45%, the quantity $\tau$ is less than 3, where $\tau=(-16.6\times[water]+2.9)\times F+(22.5\times[water]-3.5)\times(S+SMP)+(66.9\times[water]-11.8)\times C$.

18 Claims, No Drawings

FOOD PRODUCT COMPRISING A SOLID MASS BASED ON CHOCOLATE OR THE LIKE IN CONTACT WITH AN AQUEOUS PHASE

This application is a national stage filing under 35 U.S.C. § 371 of international application no. PCT/FR00/01368, filed on May 19, 2000. This application also claims the benefit of priority under 35 U.S.C. § 119(a) to French patent application no. 99/06,480, filed on May 21, 1999.

BACKGROUND OF THE INVENTION

The present invention relates to a food product comprising a substantially solid mass based on chocolate or a chocolate-like product in contact with a moist medium in the non-gelled state, which is in particular non-milk-based, having a local free water content of between 30 and 45%, preferably 35 to 45%, said substantially solid mass having a low water uptake under appropriate preservation conditions. The invention therefore relates to compositions which may be kept at room temperature.

The invention relates more particularly to food products intended to be preserved at room temperature, based on fruit or other sweetened or milk bases, optionally in the presence of thickeners and flavoring agents, having a local free water content of 30 to 45%.

Food bars are known which consist of an anhydrous or an only slightly hydrated filling surrounded by a shell made of chocolate or a chocolate-like product.

The use of a layer of chocolate intercalated between a tart base or a wafer and a moist filling to try to prevent the water content in a wet filling from migrating to the tart base or the wafer, is known. The efficacy of this barrier is in fact only a few hours. It is observed, in this case, that the chocolate has completely lost its crunchy character.

Food bars are known which consist of a filling coated with a shell made of chocolate or a chocolate-like product.

Pastry, biscuit or vienna-type products are known which comprise one or more doughs. These comprise in addition:

on the one hand, pieces or fillings or coatings, based on fruit (in the form, for example, of marmalade, jams, fruit puree), or based on other moist ingredients (for example compositions based on milk), and, on the other hand, chocolate or a chocolate-like product in the form of one or more layers, or in the form of chips. In these products, unlike those of the invention, the quality of the chocolate can only be preserved under one or more of the following conditions:

they are consumed only a few days after manufacture,
the water activity of the product is very low,
the product is refrigerated.

Otherwise, hydration of the solid masses of chocolate or a chocolate-like product is observed which leads to several negative effects which make the product unfit for consumption.

On the one hand, the chocolate or chocolate-like product being a product which is naturally contaminated, its hydration causes the development of bacteria which contaminate the aqueous phase, which is unacceptable because of the preservation standards required in industrialized countries.

On the other hand, the taste value of the solid masses of chocolate or a chocolate-like product lies in their "crunchy" character which is specific to the substance. Excessive hydration (migration of the water across the thickness of the chocolate) causes its decolotization, except for white chocolate, and its gradual softening (destruction and loss of crunchiness) by the outside and leads to rejection of such a food product by the consumer.

The production of a chocolate or a chocolate-like product which is resistant to water is therefore of major interest for the development of food products comprising a phase whose local free content of water is significant, in contact with a solid mass of chocolate or a chocolate-like product.

Conventional chocolates as this is well known can be divided into three categories according to the cocoa content:

dark chocolate about 19% dry and defatted cocoa,
milk chocolate about 6% dry and defatted cocoa,
white chocolate 0% dry and defatted cocoa.

In milk and white chocolates, a portion or the whole of the dry and defatted cocoa is replaced by milk fat or milk particles. The normal sugar content of chocolates is of the order of 25 to 57%. However, these chocolates exhibit an excessive water uptake for the desired applications indicated above.

Accordingly, it has already been proposed to modify the compositions of chocolate or a chocolate-like product so as to adapt them to the abovementioned embodiments.

Patent EP 0 615 692 describes a milk-based refrigerated product containing pieces of chocolate which can be preserved for 5 to 6 weeks in the refrigerator and whose pieces preserve their integrity well during this lapse of time.

This patent indicates that the sugar level is between 1 and 10% and preferably between 1 and 3%. However, such an embodiment leads to solid masses of chocolate or a chocolate-like product having a bitter taste which can put off certain consumers. Furthermore, in order to mask this bitterness as much as possible, it is necessary to limit the size of the chocolate particles, in particular between 1 and 4 mm.

Patent application EP-A-770 332 also describes a food product in which one or more layers consist of a breakable solid mass of chocolate. The chocolate layer has a thickness of between 0.1 and 3 mm and a sugar content of less than 17%, preferably between 2 and 3%. According to this document, such a layer preserves the crunchy character desired by the consumer.

It will be noted that this document presents a teaching similar to patent application EP-A-615 692 since in both cases, it is recommended to minimize the sugar content, which leads to very unbalanced chocolates from the organoleptic point of view (bitter, not sweet, low flavor).

The chocolates thus produced are therefore very unbalanced from the organoleptic point of view (bitter, not sweet, low flavor).

After systematic studies, the applicant has demonstrated that, contrary to the teachings described in the abovementioned documents, the water-resistant character of the chocolate was not linked to the low sugar content. Because of this, the invention breaks with the bias according to which sugar is more unfavorable to water resistance than cocoa. Moreover, the invention shows that it is possible to produce water-resistant chocolates whose fat content is less than 80%, advantageously less than 68% and even preferably less than 65%, which avoids a fatty mouthfeel and an unfavorable nutritional image, while preserving a good organoleptic balance.

The applicant has found that a novel chocolate or chocolate-like product composition in the form of a solid mass made it possible to use said mass of chocolate or a chocolate-like product in combination with an aqueous phase while preserving the desired crunchy character.

These solid masses in the aqueous phase may be preserved at room temperature for at least two weeks up to more than five weeks, which constitutes the desired shelf life for this type of food product.

The expression room temperature is generally understood to mean a temperature of between 10° C. and the melting point of the cocoa fat or the like. These solid masses are therefore distinguishable from craft pastry products.

SUMMARY OF THE INVENTION

In general, the invention is characterized in that the substantially solid mass of chocolate or chocolate-like product comprises, as a percentage by weight:

| | |
|---|---|
| * fat | 43 to 68% |
| * dry and defatted cocoa | <25% |
| * skimmed milk powder | <17% |
| * an appropriate quantity of sugars | >13% | the solid mass being such that for an aqueous phase having a local free water content of between 30% and 45%, preferably 35–45%, the parameter (T) is less than 3, the parameter T being defined by the equation:

$$\tau=(-16.6\times[\text{water}]+2.9)\times F+(22.5\times[\text{water}]-3.5)\times(S+SMP)+(66.9\times[\text{water}]-11.8)\times C \text{ with:}$$

[water] is the local free water content of the moist phase in contact (in g/g),

F is the fat content of the chocolate or equivalent (g/g),

S+SMP is the content of sugars+skimmed milk powder in the chocolate or equivalent (in %), C is the dry and defatted cocoa content of the chocolate or equivalent.

The local free water content [local free water] is defined by the equation:

[local free water]=[total water]$\times A_W$ 25° C./100-F in which:

[local free water] is given in grams of water per 100 grams of product

F is given in grams of fat per 100 grams of product.

For a non-fatty gel containing 42.6% of water and with $A_W$ 25° C. 0.85, the local free water content is 36.2%.

According to one variant, the proportion of dry and defatted cocoa and of skimmed milk powder is such that their sum is less than 25%.

DETAILED DESCRIPTION OF THE INVENTION

The invention is therefore defined in particular by a test described in the form of a mathematical equation which saves persons skilled in the art from carrying out the experiments. However, insofar as may be necessary, an experimental procedure is indicated below which allows persons skilled in the art to determine the compositions which satisfy the objectives which the invention proposes to achieve.

The test is carried out, for example, which consists in bringing slices of chocolate 1.5±0.2 mm thick and 20 mm in diameter into contact with an agar gel having a local free water content of 36%. The chocolate slices are obtained after tempering and cooling the chocolate to 13° C., storing for 3 days at 18° C. and then for 12 hours at 10° C. The gel is poured into syringes which are cut at their end and covered with the slice of chocolate and are then closed again. The whole is stored for 35 days at 25° C. and the water uptake of the slice of chocolate is measured at D35 by the "Karl Fischer" method, OICCC No. 105 (1988).

The compositions which satisfy the criteria of the invention are those whose percentage of water uptake after 35 days of preservation at 25° C. will be <17.7%; the table below gives an indication of the percentages of water uptake after 35 days at 25° C. according to the water resistance of the chocolate (test carried out after stabilization at 18–20° C.).

| % water uptake | Water resistance |
|---|---|
| >17.7 | No resistance |
| 11.8 to 17.7 | Average resistance |
| 5.9 to 11.8 | Good resistance |
| <5.9 | Very good resistance |

These substantially solid masses of chocolate or chocolate-like product have excellent properties as barrier to water while preserving the organoleptic qualities necessary for using the food products according to the invention.

In the case of milk chocolate or white chocolate, a portion or the whole of the dry and defatted cocoa is replaced by a skimmed or nonskimmed powdered milk, while of course preserving the proportions indicated in the general definition of the invention.

The composition of the substantially solid: mass comprises, according to one variant, an emulsifier, in particular lecithin. The lecithin content is preferably less than 1% by weight relative to the solid mass. The composition of the substantially solid mass may also comprise flavorings.

The sugars are in particular monosaccharides or disaccharides. Among the monosaccharides, there may be mentioned fructose, galactose and glucose. Among the disaccharides, there may be mentioned in particular sucrose which is a sugar commonly used for producing chocolate, but sucrose may be partially or completely replaced by another disaccharide such as lactose.

It has been found that the replacement of part of the sucrose by another disaccharide of the lactose type (in an amount of 0 to 50%) made it possible to obtain equivalent barrier properties of the chocolate toward the aqueous phases.

In general, the fat is cocoa butter. It is however possible to replace up to 20% of the cocoa butter by anhydrous milk fat (AMF) or to replace all or part of the cocoa butter by one or more SFC (solid fat content) vegetable fats, measured at 10° C., greater than 50%.

The expression chocolate-like product is understood to mean any confectionery fatty mass containing a continuous fatty phase consisting of one or more fatty substances of plant or animal origin and whose properties are similar to those of cocoa butter. These fatty masses are generally called compound or glazing paste.

The invention is remarkable in that the solid mass of chocolate or chocolate-like product may be provided in the form of chips or grains, in particular having a size greater than 4 mm, which allows consumers, when these chips are incorporated into a food composition, to recognize and appreciate the chocolate taste and the crunchy feel. In other words, the expression "grains of chocolate or a chocolate-like product" is understood to mean solid particles whose size is sufficient to confer on them the chocolate taste characteristic of this substance.

The chips or grains may also constitute hydrophilic compounds such as biscuits, cereals, dry fruit coated with a layer of solid mass of chocolate or chocolate-like product.

It will also be noted that the chocolate or chocolate-like product according to the invention has a sugar content sufficient to make it possible to avoid the bitter taste inherent to cocoa.

The invention is also remarkable in that the substantially solid mass may be provided in the form of a shell partially or completely coating an aqueous filling. Because of its water-resistant character, the solid mass of chocolate or chocolate-like product makes it possible to preserve said filling for the appropriate period without losing its crunchy character. It makes it possible, in addition, to avoid drying of the filling.

The solid mass of chocolate or chocolate-like product may also be provided in the form of a continuous or discontinuous layer in contact with an aqueous phase or a multilayer structure consisting of layers separated by layers of an aqueous phase. The function of the solid mass of chocolate is also that of a barrier layer against water. It makes it possible to avoid or to limit the transfer of water from the aqueous phase to the dry phases based, for example, on paste or on cereals.

In general, it is possible to define the embodiments obtained from the solid masses of chocolate or chocolate-like product in the following manner:

shell of solid mass coating a filling shell of solid mass coating a filling loaded with grains of solid mass, food composition consisting of a continuous phase and loaded with grains of solid mass, food composition coated with a continuous or discontinuous top layer of solid mass, multilayer structure comprising one or more continuous or discontinuous layers of solid mass.

Other embodiments resulting from the combination of one or more of these variants are also included in the definition of the invention.

The continuous phase preferably consists of preparations based on fruit, emulsified or aqueous filling, moist biscuit or pastry dough.

Depending on the thickness of the solid mass of chocolate or chocolate-like product, the value of τ should not exceed a maximum value in order to ensure resistance to water and therefore a sufficient crunchiness. The higher the thickness of the solid mass, the higher the maximum τ value. Accordingly, persons skilled in the art will be able to choose an optimum composition of the solid mass according to the desired thickness. Likewise, the value of τ should be chosen according to the shelf life. The shorter the shelf life, the higher may be this value. In general, τ is advantageously less than 2, preferably less than 1.6.

Furthermore, taking into account the preceding text, in the case where the solid mass has a thickness of less than 1.5 mm, the food product according to this variant is characterized in that τ is less than or equal to 2, preferably less than 1.6. It is of course understood that the thickness is understood relative to the distance of the zone furthest from the aqueous phase. In other words, if a slice of solid mass is in contact on both sides with the aqueous phase, this zone will be the middle zone. In the case of a chip, the zone will be the central zone or central point.

Preferably, the food product is characterized in that the substantially solid mass comprises, as a percentage by weight:

| | |
|---|---|
| * fat | 43 to 68%, preferably 43 to 65%, |
| * dry and defatted cocoa | 0 to 19% | and/or skimmed milk powder 0 to 17% sugars in appropriate quantity the sum of the proportions of dry and defatted cocoa and skimmed milk powder being less than 25%.

The solid mass finds a particularly advantageous application in combination with an aqueous base such as fruit preparations (jam, fruit puree) or other edible moist phases, such as an aqueous filling.

According to a general embodiment, the food product is characterized in that the solid mass based on chocolate or a chocolate-like product is in the form of grains, a shell partially or completely coating a nonmilk filling or a continuous layer deposited on a nonmilk composition.

According to one embodiment, the food product is characterized in that it consists of a continuous aqueous phase comprising a nonmilk composition loaded with grains or chips of chocolate or a chocolate-like product.

It also relates to a filling comprising a milk base, optionally loaded with grains of chocolate or a chocolate-like product, said filling being coated with a shell consisting of a substantially solid mass of chocolate or a chocolate-like product as defined above. The thickness of such an envelope is generally between 1 and 4 mm and the coating may be carried out by traditional molding or molding-pressing as described in patent application WO 98/35566.

According to another embodiment, the food product is characterized in that it consists of a food barrier consisting of a shell made of chocolate or a chocolate-like product and a filling, optionally loaded with grains of chocolate or a chocolate-like product.

According to another embodiment, the food product is characterized in that it consists of a continuous aqueous phase, optionally loaded with grains of chocolate or a chocolate-like product, said aqueous phase being covered at the surface with a continuous or discontinuous layer of a solid mass of chocolate or a chocolate-like product.

According to another embodiment, it relates to a multilayer structure consisting of layers separated by a moist food composition and one or more layers of solid mass of chocolate or a chocolate-like product.

The solid masses of chocolate or a chocolate-like product described above are produced according to traditional methods known in the art.

The examples below illustrate the invention.

Various compositions of dark and milk chocolate, and of an equivalent, were prepared in a conventional manner. The chocolates all contained 0.5% lecithin, an emulsifier commonly used to increase the fluidity of the chocolate during its manufacture. Lecithin is counted with the fat.

The fat is either cocoa butter, or any other cocoa butter equivalent.

The chocolates were manufactured from cocoa liquor.

Examples Relating to Chocolate Chips

Chocolate chips are included in an aqueous continuous phase of 45% local free water.

The chocolate is tempered and crystallized into chips (roughly spherical, diameter=3 mm) directly at the surface of the aqueous phase; and then a second layer of aqueous phase is applied.

The product is stored at 25° C./30 days.

A composition was studied (mixture of sugars, cocoa paste and cocoa butter; 0.5% lecithin, included in the fat). It is presented in the table below at the same time as its water uptake after 30 days.

| x. | %F | %DDC | %S | DDC/S | LFW | τ | % water |
|---|---|---|---|---|---|---|---|
| 1 | 65% | 8% | 27% | 0.3 | 45 | 0.3 | <5 |

LFW = Local Free Water
% water = mean water measured (D30).

A chocolate of example 1 has excellent resistance for a local free water content of 45%.

Examples Relating to Aqueous Media with a Local Free Water Content of 36%

Moisture uptake trials for an aqueous phase with a local free water content of 36%.

The following solid mass compositions were produced by carrying out the procedure according to conventional methods for the preparation of chocolate.

The measurements are carried out according to the following test:

The slices of chocolate were obtained by molding in molds. The crystallization of the chocolate is obtained after two 8-minute passages in a cold tunnel at 13° C. After unmolding, the slices of chocolate are preserved for 3 days at 18° C. in order to end their crystallization.

The results are expressed as % of water taken up by the chocolate (thickness=1.5±0.2 mm) after 28 days of contact at 25° C. with an agar gel with 42% moisture and aw=0.85 (local free water content=36.2%): (cf. tables below).

resistance of the chocolate to water transfer but that this factor (% total fat) is not sufficient on its own since a chocolate with 50% fat can have a result close to that of a chocolate containing only 31% fat.

It is therefore of great importance to develop the reduced fat and reduced cocoa formulas for cost and nutritional quality considerations (within the limit of the desired organoleptic constraints).

The following examples describe an aqueous phase coated with a chocolate shell.

The use of a preparation of fruit rich in water is highly appreciated when contrasts in texture are: sought between the chocolate and the fruit or when a fresh fruit taste is sought.

An example of application is the manufacture of a molded chocolate product (or equivalent) whose thickness is 1.3±0.2 mm containing an inside rich in water and preserved at room temperature. This moist inside may be a fruit preparation (jam, fruit puree) or any other edible moist phase (aqueous filling, and the like).

Laboratory tests made it possible to compare the water resistance of 4 chocolate formulations placed in contact with a jam as described in the table below:

| Characteristics of the jam | |
|---|---|
| Brix | 58% |
| Water content | 42% |
| Aw (Example) | 0.9 |

Laboratory tests on such an embodiment showed that the barrier properties of the chocolate depend not only on its fat content but also on its cocoa content (as claimed in this patent).

For that, four chocolate formulations rich in fat to a greater or lesser degree (31.5% to 50%) and rich in cocoa to SUMMARY TABLE OF THE BARRIER PROPERTIES OF VARIOUS CHOCOLATES ACCORDING TO THEIR COMPOSITIONS

| Examples | Fats | Sugars | Defatted cocoa | τ calculated from the equation | Experimental results for the water contents of the chocolates preserved 28 Days at 25° C. | DDC/S |
|---|---|---|---|---|---|---|
| 2 | 50 | 20 | 30 | 3.1 | 13% | 1.5 |
| 3 | 50 | 35 | 15 | 1.9 | 10% | 0.43 |
| 4 | 50 | 47 | 3 | 1.0 | 5% | 0.06 |
| 5 | 50 | 50 | 0 | 0.8 | 2.8% | 0 |
| 6 | 31 | 55 | 14 | 3.3 | 16.5% | 0.25 |
| 7 | 31 | 46 | 23 | 4.0 | 20% | 0.5 |

| COMPOSITION OF THE AGAR GEL | |
|---|---|
| | 0.85 |
| Water | 41.5 |
| Sucrose | 41.5 |
| Dextrose monohydrate | 6.9% |
| glycerol | 8.3% |
| agar | 1.5% |
| potassium sorbate | 0.3% |
| total | 100 |
| $[H_2O]_{gel}$ | 42.6% |

These results show the harmful effect of the defatted cocoa on the barrier properties of the chocolate, even at a constant fat content. These results confirm that a 31% to 50% increase in the fat very significantly improves the a greater or lesser degree (10% to 30%) served for the manufacture of molded chocolate products containing jam. The compositions of these four chocolates are described in the following table:

Composition of the chocolate

| Examples | 8 | 9 | 10 | 11 |
| --- | --- | --- | --- | --- |
| Cocoa butter % | 31.5 | 60 | 60% | 60 |
| Sucrose % | 52.7 | 30 | 20% | 10 |
| Defatted cocoa % | 15.8 | 10 | 20% | 30 |
| τ (according to equation 2) | 3.7 | 0.8 | 1.7% | 2.5 |
| DDC/S | 0.3 | 0.3 | 0.5% | 3 |

The characteristics of the jam used and placed inside these molded products are described in the following table:

Characteristics of the jam

| Water content | 42% |
| --- | --- |
| Aw (example) | 0.9 |
| % Local water | 38% |
| Brix | 58% |

After 4 weeks of preservation at 25° C., the chocolate of example 8 took up more than 16.5% of water (τ>3) and exhibits high softening with numerous cracks on the contours of the chocolate. With the chocolate of example 9, the preservation of the crunchiness is substantially improved and the chocolate has approximately 6% water after 4 weeks at 25° C. With the chocolates of examples 10 and 11, the chocolates exhibit a reduction in crunchiness which is more marked the higher the cocoa content of the chocolate.

These four examples show that the barrier properties of w the chocolate against water do not only depend on the fat content of the chocolate but on the right balance between fat content and defatted cocoa content.

Example Relating to an Aqueous Medium With a Local Free Water Content of 42%

If the jam (or any other moist phase) contains a local free water content which is higher than the preceding example (e.g. 42%), the barrier properties should be further increased in order to preserve a satisfactory crunchiness (less than 11% of water and if possible less than 5.5% of water). In this case, the table below describes the composition of a chocolate having sufficient barrier properties for application at 25° C. for 4 weeks.

The chocolate composition comprising less than 11% of water after 4 weeks at 25° C. with a jam rich in water (local free water content=42%) is given below:

| Example | 12 |
| --- | --- |
| Cocoa butter | 65 |
| Sucrose | 24 |
| Dry and defatted cocoa | 11 |
| τ calculated | 0.7 |
| DDC/S | 0.45 |

What is claimed is:

1. A food product, comprising a substantially solid mass based on chocolate or a chocolate-like product in contact with an aqueous phase in unfrozen state, having a local free water content of from 30 to 45%, said substantially solid mass having a low water uptake under appropriate preservation conditions, wherein the substantially solid mass comprises, as a percentage by weight:

| * fat | 43 to 68% |
| --- | --- |
| * dry and defatted cocoa | <25% |
| * skimmed milk powder | <17% |
| * an appropriate quantity of sugars | >13% | the solid mass being such that for the aqueous phase having a local free water content of from 30% to 45%, the parameter (τ) is less than 3, with the parameter τ being defined by the equation:

$$\tau = (-16.6 \times [water] + 2.9) \times F + (22.5 \times [water] - 3.5) \times (S + SMP) + (66.9 \times [water] - 11.8) \times C,$$ with:

[water] is the local free water content of the aqueous phase in contact (in g/g), F is the fat content of the chocolate or equivalent (g/g), S+SMP is the content of sugars+skimmed milk powder in the chocolate or equivalent (in %), C is the dry and defatted cocoa content of the chocolate or equivalent.

2. The food product of claim 1, wherein τ is less than or equal to 2.

3. The food product of claim 2, wherein τ is less than 1.6.

4. The food product of claim 1, wherein the substantially solid mass comprises, as a percentage by weight:

| * fat | 43 to 68% |
| --- | --- |
| * dry and defatted cocoa | 0 to 19% |
| * skimmed milk powder | 0 to 17% |
| * sugars in appropriate quantity | | the proportion of dry and defatted cocoa and of skimmed milk powder being such that their sum is less than 25% and the dry and defatted cocoa/sugar and optionally skimmed milk powder weight ratio being less than 1.2.

5. The food product of claim 1, wherein the dry and defatted cocoa/sugar and optionally skimmed milk powder weight ratio is from 0 to 0.5.

6. The food product of claim 1, wherein the aqueous phase is a continuous phase.

7. The food product of claim 1, wherein the solid mass based on chocolate or a chocolate-like product comprises grains, or a shell partially or completely coating a filling, or a continuous layer deposited on a composition having a continuous aqueous phase.

8. The food product of claim 7, comprising a continuous aqueous phase, loaded with grains of the chocolate or chocolate-like product.

9. The food product of claim 7, comprising a food barrier comprising a shell made of the chocolate or chocolate-like product and a filling, optionally loaded with grains of the chocolate or chocolate-like product.

10. The food product of claim 7, comprising a continuous aqueous phase, optionally loaded with grains of the chocolate or chocolate-like product, said aqueous phase being covered at the surface with a continuous or discontinuous layer of a solid mass of the chocolate or chocolate-like product.

11. The food product of claim 7, comprising a multilayer structure comprising layers separated by a moist food composition and one or more layers of solid mass of the chocolate or chocolate-like product.

12. The food product of claim 1, wherein the fat is cocoa butter, anhydrous milk fat (AMF), one or more vegetable oils, or mixtures thereof.

13. The food product of claim 12, wherein the fat comprises 80 to 100% cocoa butter and 0 to 20% anhydrous milk fat.

14. The food product of claim 1, wherein the sugar is one or more disaccharides, one or more monosaccharides, or mixtures thereof.

15. The food product of claim 14, wherein the one or more disaccharides comprise 50 to 100% of sucrose and 0 to 50% of lactose.

16. The food product of claim 14, wherein the sugar is sucrose, lactose, fructose, or mixtures thereof.

17. The food product of claim 1, wherein the aqueous phase has a local free water content of from 35 to 45%.

18. The food product of claim 1, wherein the aqueous phase has a local free water content of from 35 to 45% and is a continuous phase.

* * * * *

UNITED STATES PATENT AND TRADEMARK OFFICE
CERTIFICATE OF CORRECTION

PATENT NO. : 6,733,805 B1
DATED : May 11, 2004
INVENTOR(S) : Christophe Loisel et al.

It is certified that error appears in the above-identified patent and that said Letters Patent is hereby corrected as shown below:

<u>Column 2,</u>
Line 1, "decolitization" should read -- decolorization --.

<u>Column 3,</u>
Lines 22-23, "the parameter (T) is less than 3, the parameter T being defined by the equation:" should read -- the parameter ($\tau$) is less than 3, the parameter $\tau$ being defined by the equation: --.

Signed and Sealed this

Thirtieth Day of November, 2004

JON W. DUDAS
*Director of the United States Patent and Trademark Office*